Patented Aug. 9, 1927.

1,638,522

UNITED STATES PATENT OFFICE.

GUY H. BUCHANAN, OF WESTFIELD, AND JOHN L. OSBORNE, OF ELIZABETH, NEW JERSEY, ASSIGNORS TO AMERICAN CYANAMID COMPANY, OF NEW YORK, N. Y., A CORPORATION OF MAINE.

PROCESS OF CONVERTING A CYANIDE COMPOUND INTO AMMONIA.

No Drawing. Application filed December 18, 1923. Serial No. 681,445.

This invention relates to a process of converting a cyanide compound into ammonia, in which the material is subjected to a digestion treatment, preferably at elevated temperatures and under superatmospheric pressure, and the liberated ammonia drawn off and absorbed in water or caused to unite with acids. It refers in particular to the treatment of an easily decomposable cyanide compound which may be converted under comparatively low temperatures and pressures with almost quantitative yields, into ammonia.

The invention involves the employment of a material that is easy to treat and which will freely liberate its combined nitrogen in the form of substantially pure ammonia gas by a low temperature digestion. Further, the process only requires a comparatively inexpensive apparatus. With these and other objects in view, the invention consists in the various steps and combinations of steps constituting the process, all as will be more fully hereinafter described and particularly pointed out in the claims.

We preferably employ as a base material a cyanide product, the same as, or similar to that described in U. S. Patent #1,359,-257, to Walter S. Landis, because it is easily decomposed and readily lends itself to a decomposition resulting in the desired al- decomposition resulting in the desired almost quantitative formation of ammonia and other valuable products. This crude cyanide compound which is essentially calcium cyanide associated with a number of inert impurities, such as sodium chloride, graphite, and free lime, has been found to be very active chemically.

Under certain conditions, it may be decomposed by the moisture of the atmosphere with the liberation of its nitrogen content in the form of hydrocyanic acid, and it may even liberate some ammonia at ordinary temperatures. This great chemical activity doubtless explains the ease with which this said cyanide compound yields up all, or substantially all of its nitrogen in the form of ammonia, in the presence of water, when under temperatures and pressures much lower than are required for the decomposition of the cyanide compounds heretofore known.

As an example of our process we add 1 part of the said crude cyanide compound to 3.6 parts of water, the mixture being preferably made in a closed iron vessel of any convenient size. The crude cyanide compound, which is usually produced in the form of thin flakes, dissolves with great rapidity in the water, so no elaborate stirring mechanism is necessary. We then close the vessel and introduce a current of steam into it to decompose the cyanide and liberate its combined nitrogen in the form of ammonia. The steam inlet is made at the bottom to insure a thorough mixing. The temperature and pressure due to the steam and liberated ammonia gas may be allowed to rise until the pressure has reached more than an atmosphere, or say to approximately four atmospheres; the steam is shut off and the charge is held under this pressure for from five to approximately thirty or more minutes, the pressure being preferably relieved when it rises above four atmospheres by venting the ammonia from the digester. At the end of the thirty minute interval, the pressure on the digester being relieved and the gaseous ammonia being discharged, the ammonia remaining dissolved in the solution may be displaced by bubbling steam through the mixture. The vented ammonia is led into a separator where the entrained solution and solids are separated. From the separator the ammonia may be used directly or if mixed with steam it may be passed to a column and condenser where the ammonia and the steam may be separated in the known manner. The purified and substantially dry ammonia may now be absorbed in water, or in acids, or may be liquefied or otherwise treated. The residue in the digester, which is now free from nitrogen compounds, may be filtered or evaporated for the recovery of a solid to be employed in another art.

It is well known that other cyanide compounds, as for example the alkali metal cyanides, are stable compounds requiring prolonged heating at elevated temperatures and pressures in order to convert their nitrogen components into ammonia. When such compounds are used as sources of ammonia it is well known that it is therefore necessary to employ expensive apparatus capable of withstanding high pressures. It is also recognized that it is necessary to install steam generating equipment capable of producing the high pressure steam required for the decomposition of such cyanides. This invention, on the other hand, differs radically from the prior procedures in that it requires neither an expensive apparatus nor a high pressure steam equipment, due to the easily decomposable nature of the crude calcium cyanide compound employed. Hence the capital investment required for the production of a given quantity of ammonia is greatly reduced, when the process of this invention is used. Further, by this new process it is possible to produce ammonia in a simple manner wherever needed, particularly under circumstances and where a special equipment is not available. That is, this process is especially adapted to operations employing ammonia and located in places to which access is difficult, as for example to mining operations employing ammonia in the extraction of copper. Heretofore, it has been necessary to transport the ammonia as liquefied ammonia in heavy and expensive cylinders, or in a dilute form as aqua ammonia in heavy iron drums or in glass containers. According to the present process the crude cyanide compound may be shipped to the point of consumption in light sheet iron containers and there converted into ammonia in a simple and comparatively inexpensive apparatus.

The residue remaining in the digester after the liberation of the ammonia usually consists of a mixture of solids and a solution. The solids consist essentially of free lime and graphite while the solution consists essentially of sodium chloride and calcium formate dissolved in water. By a simple filtration the worthless solids may be separated from the solution, and the latter is then available for the separation therefrom of the formate compounds which may be employed for the production of formic acid or of other commercially valuable compounds. It is preferred in many cases to wash the sludge solids and to use the wash water in making up succeeding digester charges.

It is evident that those skilled in the art may vary the details of the process, and the nature of the product, without departing from the spirit of the invention. We therefore do not wish to be limited in the above disclosures except as may be required by the claims.

What we claim is:

1. A method of forming ammonia which comprises digesting a composition containing calcium cyanide with water at a superatmospheric pressure and at elevated temperatures, maintaining said pressure by venting the ammonia produced, and then expelling the remainder of the ammonia.

2. A method of forming ammonia which comprises digesting a composition containing calcium cyanide with water at about four atmospheres pressure and at elevated temperatures, maintaining said pressure by venting the ammonia produced during the digestion, and then expelling the remainder of the ammonia.

3. A method of forming ammonia which comprises digesting a composition containing calcium cyanide with water at a superatmospheric pressure and at elevated temperatures, maintaining said pressure by venting the ammonia produced during the digestion, and then expelling the remainder of the ammonia and washing the solids remaining.

4. A method of forming ammonia which comprises digesting a composition containing calcium cyanide with water at a superatmospheric pressure and at elevated temperatures, maintaining said pressure by venting the ammonia produced, and expelling the remainder of the ammonia by bubbling steam thru the mass.

5. A method of forming ammonia which comprises digesting a composition containing calcium cyanide with water at a superatmospheric pressure and at elevated temperatures to form ammonia, releasing the pressure and allowing ammonia to distill off, and expelling the remainder of the ammonia by bubbling steam thru the mass.

In testimony whereof we affix our signatures.

GUY H. BUCHANAN.
JOHN L. OSBORNE.